United States Patent
Anderson et al.

(10) Patent No.: US 6,744,451 B1
(45) Date of Patent: Jun. 1, 2004

(54) METHOD AND APPARATUS FOR ALIASED ITEM SELECTION FROM A LIST OF ITEMS

(75) Inventors: Doug Anderson, Mountain View, CA (US); Jeffrey C. Hawkins, Redwood City, CA (US); Robert Y. Haitani, San Jose, CA (US); Justin Manus, Stanford, CA (US)

(73) Assignee: Handspring, Inc., Mountain View, CA (US)

( * ) Notice: Subject to any disclaimer, the term of this patent is extended or adjusted under 35 U.S.C. 154(b) by 603 days.

(21) Appl. No.: 09/771,026

(22) Filed: Jan. 25, 2001

(51) Int. Cl.[7] .................................................. G09G 5/00
(52) U.S. Cl. ..................... 345/841; 345/816; 345/825; 345/864; 345/772
(58) Field of Search ................................ 345/710, 739, 345/729, 705, 708, 968, 786, 784, 841, 816, 825, 864, 772

(56) References Cited

U.S. PATENT DOCUMENTS

| | | | | |
|---|---|---|---|---|
| 4,817,129 A | * | 3/1989 | Riskin | 379/88.24 |
| 4,862,390 A | * | 8/1989 | Weiner | 345/822 |
| 5,220,652 A | * | 6/1993 | Rowley | 345/156 |
| 5,544,358 A | * | 8/1996 | Capps et al. | 715/523 |
| 5,786,819 A | * | 7/1998 | Weiser et al. | 345/840 |

OTHER PUBLICATIONS

Microsoft Outlook 2000, Copyright 1995–1999 Microsoft Corp. Address Book information.*

* cited by examiner

Primary Examiner—John Cabeca
Assistant Examiner—Sara M. Hanne
(74) Attorney, Agent, or Firm—Dag Johansen; Stattler Johansen & Adeli LLP (57) ABSTRACT

The present invention introduces an aliased selection system with audible cues to allow a user of a handheld computer system locate a desired item from a list of item. The aliased selection system allows a user to spell out a desired item by activating an input that specifies a subset that containing a next letter. In one embodiment, two different subsets are used: A to M and N to Z. When the user has entered information on enough letters such that the number of possibilities fits entirely on a display screen then a first audible cue is given. The user may enter additional information on until a single list item is uniquely identified. Once a single item is uniquely identified, the system emits a second audible cue that informs the user that a single item has been specified. The aliased selection system allows a user to select a desired item from a list with a single hand and without looking at the display screen. However, the user may shorten the selection process by looking at the display screen.

20 Claims, 7 Drawing Sheets

Adams, Horst
Anderson, Ole
Black, Mark
Cameron, Rob
Campbell, Pat
Cusack, Robin
Deckard, John
Johnson, Robert
Johnson, Ted
Lorist, Matt

Norris, Jackie
OConnell, Ralph
Ragu, Helen
Stern, Susan
Taupin, Ray
Thorson, Hans
Underhill, Nancy
Verhoeven, Jim
Wang, Arnold
Watson, Steve

OConnell, Ralph
Ragu, Helen
Taupin, Ray
Thorson, Hans
Verhoeven, Jim
Wang, Arnold
Watson, Steve
Webber, Sarah

Figure 3d

Ragu, Helen
Webber, Sarah

Figure 3e

Webber, Sarah

Figure 3f

First name:Sarah
Last name:Webber
Phone: 650-555-1234
Fax:    650-555-1235
Mobile 650-555-9323
Email:Sarah@acme.com
Address: 123 Elm Street
City: Palo Alto
State: California
ZIP: 94301

METHOD AND APPARATUS FOR ALIASED ITEM SELECTION FROM A LIST OF ITEMS

FIELD OF THE INVENTION

The present invention relates to the field of computer-human interfaces. In particular the present invention discloses methods for selecting an item from a list of items with only one hand and without requiring visual feedback.

BACKGROUND OF THE INVENTION

New classes of handheld computer systems have become standard office worker tools. Specifically, many knowledge workers have purchased handheld computers such as Palm Computing, Inc.'s line of Palm® handheld computers, the Handspring™ Visor™, and the Microsoft Pocket PC to organize their schedules and store contact information. Typically, these handheld computer systems contain Personal Information Management (PIM) applications such as an address book, a calendar application, a memo application, and a To-Do list application.

Sales research has indicated that having a simple intuitive method of accessing the stored data is one of the most important aspects of a handheld computer system. Due to its simple elegant design and efficient operation, handheld computer systems based upon the Palm® Operating System (Palm OS®) have captured the majority of the handheld computer system market. With the Palm OS®, a user can launch a desired application from the handheld computer system's dormant state by simply pressing a designated application button. The selected application then opens in a state selected to best display information that the user may desire.

As previously set forth, one of the most important applications of handheld computer systems is to hold personal information. For example, an addressbook contains a list of acquaintances and a calendar application contains a list of appointments. To satisfy consumers, it would be desirable to create new useful interfaces that allow a user to select an item from such lists in a simple manner.

SUMMARY OF THE INVENTION

The present invention introduces an aliased selection system with audible cues to allow a user of a handheld computer system locate a desired item from a list of item. The aliased selection system allows a user to spell out a desired item by activating a series of inputs that specify subsets containing the letters. For example, in one embodiment the system uses two different inputs associated with two different letter subsets: A to M and N to Z. The user "spells" out the desired name by activating a series of inputs wherein each input is associated with a letter of the name. For example, the name "Mark" is entered with four inputs: A to M, A to M, N to Z, and A to M.

In one embodiment, the system emits a first audible cue when the user has entered information on enough letters such that the number of possibilities fits entirely on a display screen. The user may enter additional information on until a single list item is uniquely identified. Once a single item is uniquely identified, the system may emit a second audible cue that informs the user that a single item has been specified.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION OF THE PREFERRED EMBODIMENT

A method and apparatus for aliased selection system with audible cues is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to handheld computer systems. However, the same techniques can easily be applied to other types of electronic devices such as pagers, desktop telephones, and cellular telephones.

Handheld Computer Systems

Figure 1A:
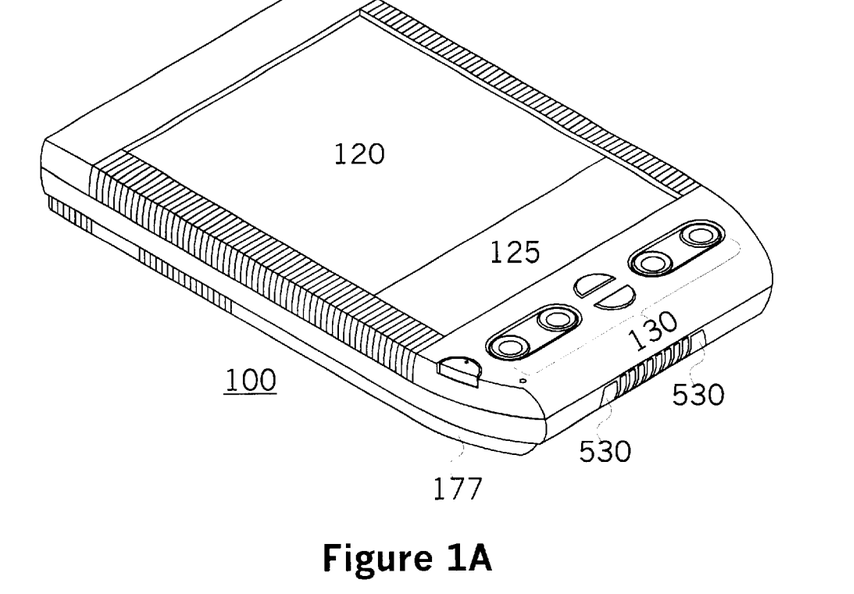
FIG. 1a illustrates a frontal view of a typical handheld computer system that may incorporate the teachings of the present invention.
Figure 1B:
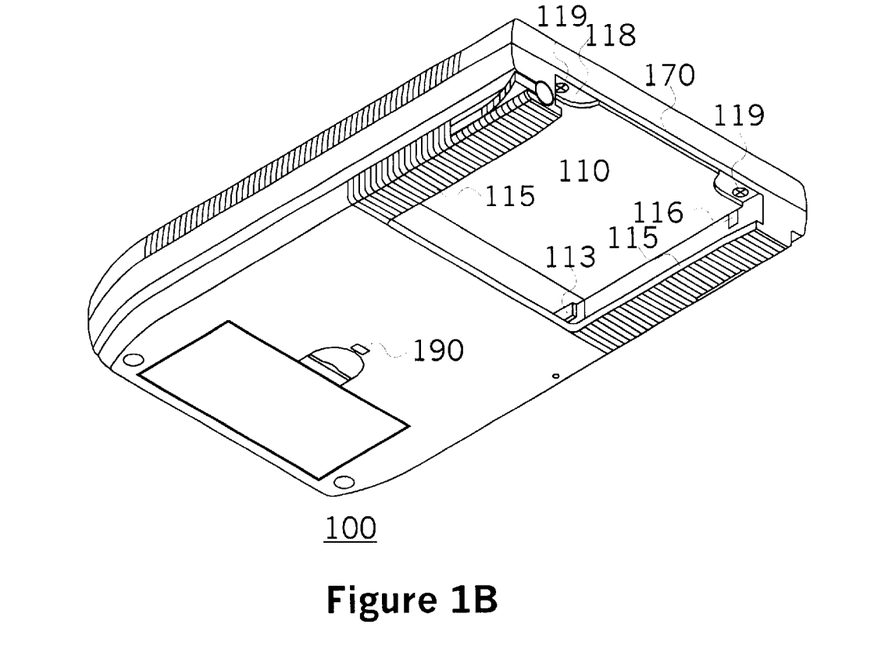
FIG. 1b illustrates a rear view of a typical handheld computer system that may incorporate the teachings of the present invention.

FIGS. 1A and 1B illustrate a handheld computer system 100. As illustrated in FIG. 1A, the mobile computer system includes a display area 120 for displaying information. The display area 120 may be covered with a digitizer pad for entering information using a stylus. The handheld computer system 100 may also include a set external buttons 130 that are also used by a user to input information into the handheld computer system 100.

One of the most important applications of handheld computer systems is maintaining an addressbook for the user. The addressbook contains the names, addresses, email addresses, and telephone numbers of acquaintances. The handheld computer system 100 has a designated external buttons 130 that are used to immediately activate particular applications. One of the external buttons may be assigned to the addressbook application. A user may use a pair of scroll buttons to scroll through a list of names in the addressbook. Alternatively, the user may use a stylus to write the name of a desired person. The user enters only part of the desired name in order to have the handheld computer system 100 search for all possible matches.

Although the scroll and search systems work well, such navigation systems are not always ideal. One situation when such navigation systems are not ideal is when a user is not able to commit full attention to the handheld computer system. For example, the user may be on a telephone call or driving an automobile. In such situations, the user may only have one hand free. Furthermore, the user may not be able to look at the display screen of the handheld computer system for an appreciable length of time. In such situations, it would be desirable to have system that would allow a user to locate a desired name with one hand and without having to look at the display screen of the handheld computer system.

Prior Directory Systems

One common types of prior art directory interface is the automated telephone directory system offered by many voicemail systems. In such automated telephone directory systems, a user spells the name of a desired person by entering the telephone digit that has the letter assigned. For example, the name "BOB" would be entered as "262". Note that this scheme involves aliasing since the same series of digits will also apply to other names. For example, the digits "262" would also apply to the name "ANA". Thus, such systems require the user to enter digits until only one possible name matches.

Although such automated telephone directory systems work in a telephone setting, such automated directory systems are not very useful for handheld computer systems. For example, such automated telephone directory systems require a telephone-like interface that lists all the letters assigned to the various telephone digits. Most handheld computers do not have such an interface. Even if such an interface is presented, such a solution is limited because most users must look at a list of letters assigned the telephone digit keys in order to enter the digits associated with a desired name in the telephone directory. Thus, the user must commit a substantive amount of attention to the task.

Aliased Directory System for Handheld Computers

To allow a user of a handheld computer system locate a desired item from a list of items, the present invention introduces an aliased selection system with audible cues. The aliased selection system with audible cues allows a user to select a desired item from a list with a single hand and without looking at the display screen. However, the user may shorten the selection process by looking at the display screen and using a direct navigation system.

Aliased Directory System Operation

Figure 2:
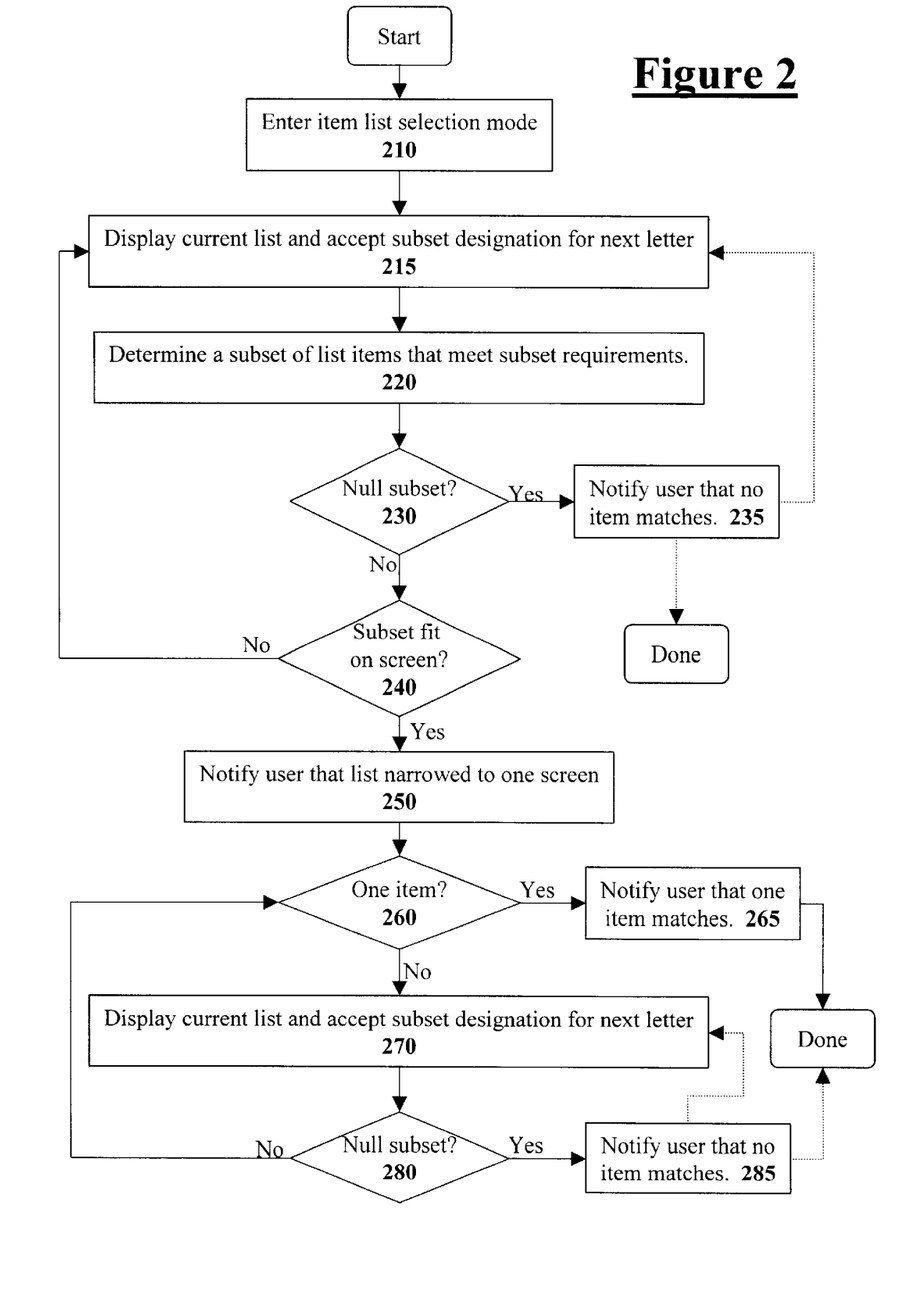
FIG. 2 illustrates a flow diagram describing how one embodiment of an aliased selection system may operate.

FIG. 2 illustrates a flow diagram that describes the operation of the aliased selection system with audible cues. Referring to FIG. 2, a user first directs the handheld computer system to enter the aliased list item selection mode at step 210. In one embodiment with the handheld computer system of FIGS. 1a and 1b, this task may be performed by simply engaging the designated addressbook external button that launches the addressbook application.

Once the handheld computer system has entered the list item selection mode, the handheld computer system displays a current list of possible items at step 215. In one embodiment, the user may use navigational keys, a mouse, a trackpad, or any other cursor control system to navigate among the items in the current list and select one of the items. However, to use the aliased selection system, the user may enter an aliased subset designation for a first letter in the desired item. For example, the user may enter an aliased subset designation for a first letter in the last name of a desired person in an addressbook.

In one embodiment, the alphabet is divided into two different aliased subsets: (1) letters A to M (ABCDEFGHIJKLM); and (2) letters N to Z (NOPQRSTUVWXYZ). The user enters the aliased subset selection using some type of available input mechanism. For example, in one embodiment a pair of input buttons are used to specify the two different aliased subsets. In such an embodiment, if a user wishes to enter the first letter of the name "BOB" then the user activates the input button associated with the first subset A to Z since the letter "B" is in that first subset containing the letters A to M.

After receiving the aliased subset selection, the aliased selection system determines a subset of list items that meet the designated subset requirements at step 220. Referring to the above "BOB" example, the system would eliminate from possibility all the list items that begin with any letter in the N to Z subset. At step 230, the systems tests if a null subset has been designated. If the user has entered an input that designates a null subset, then the system informs the user that no item matches the designated subset at step 235. In one embodiment, the system informs the user by emitting a low frequency tone that is commonly used to denote a problem. The system may also display an empty list. After informing the user of the null set, the system may terminate the aliased selection based search. Alternatively, the system may return to step 215 to allow the user to enter a different input.

Referring back step 230, if the user's input did not designate a null subset then the system determines if the current subset that meets the user's specified requirements fits entirely on the display screen of the handheld device. If the current subset that meets the user's specified requirements does not entirely fit on the display screen of the handheld device then the system returns to step 215 where the handheld computer system displays a portion of the current subset that meets the user's specified requirements and allows the user to enter additional item requirements. Specifically, the system allows the user to specify the aliased subset of the next letter in the item. Referring again to the "BOB" example, the user would trigger the button that designates the subset of M to Z since "O" is in that subset.

In one embodiment (not shown in FIG. 2), a user may enter a "stop search" input that informs the system that the user has entered all the letters of the name. Once a user enters the stop search input, the system eliminates all names having a number of letters greater than the number of letters currently designated. For example, if the user has entered the input for "B" and "O" then longer names like "Bob" will be eliminated and only two letter names such as "Bo" will remain.

Referring again to step 240, when the user has defined enough letters such that the reduced subset that meets the user's specified requirements fits entirely on a single display screen, then the system proceeds to step 250 where the system informs the user that the current subset is fully displayed on the display screen. In one possible embodiment, the system informs the user by emitting an audible indication such as a beep. This audible indication informs a user that has not been looking at the display screen that the desired item now appears on the display screen of the handheld computer system. At this point, the user may choose to look at the display screen and directly select the desired item from the display screen. For example, in a system with a digitizer touchpad over the display screen the user may directly select the displayed desired item by touching the desired item. Alternatively, the user may navigate a cursor or other screen highlight indication over the desired item using a navigation system and then enter an input that accesses the highlighted item.

The system also tests if there is only one item in the current subset of items that meets the user's specified requirements at step 260. If only one list item meets the user's requirements, then the system notifies the user that it has found a single matching list item as step 265. In a preferred embodiment, this notification includes an audible cue signal such that a user that is not looking at the handheld computer system will know that the specific desired item has been found. Ideally this audible cue is different than the audible cue used to indicate that the current subset is fully displayed on the display screen. At this point, the search is complete and the final result may be displayed on the screen in detailed form.

Referring back to step 260, if the current subset of items that meets the user's specified requirements contains more than one list item, then the system proceeds to step 270 to display the current subset of matching items and accept additional user input. After the user enters an additional input, the system determines if the user has specified a null set of possible list items at step 280. In such a case, the system informs the user that no item matches the designated subset at step 285 then the system may terminate the search or allow the user to designate a different subset by returning to step 270. If the user's input does not specify a null subset, then the system returns to step 260 to determine if one unique item has been specified. Note that at step 270, the user may decide to simply select one of the items displayed on the screen.

Aliased Directory System Operation

To fully describe the aliased selection system with audible cues, an example is provided with reference to FIGS. 3*a* to 3*f*. The following list contains twenty-four names of individuals that may be stored in a typical addressbook application:

Adams, Horst
Anderson, Ole
Black, Mark
Cameron, Rob
Campbell, Pat
Cusack, Robin
Deckard, John
Johnson, Robert
Johnson, Ted
Lorist, Matt
Norris, Jackie
O'Connell, Ralph
Ragu, Helen
Stern, Susan
Taupin, Ray
Thorson, Hans
Underhill, Nancy
Verhoeven, Jim
Wang, Arnold
Watson, Steve
Webber, Sarah
Wolfgang, Peter
Young, Paul
Zorin, Rolf In practice, many users would have even longer lists of acquaintances in their addressbook applications. To locate a particular desired name, a user may scroll through the entire list with some input mechanism or write/type the desired name into a search system. However, the aliased selection system with audible cues of the present invention allows a user to select a desired name with one hand and without looking at the display. To illustrate the operation, we will provide an example of a user wishing to locate "Webber, Sarah" from the list of names.

Figure 3A:
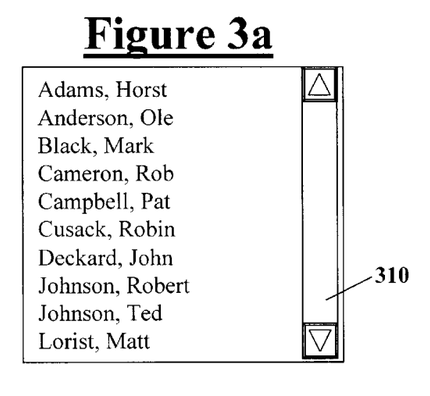
FIG. 3a illustrates an initial screen from an addressbook containing twenty-four entries.
Figure 3B:
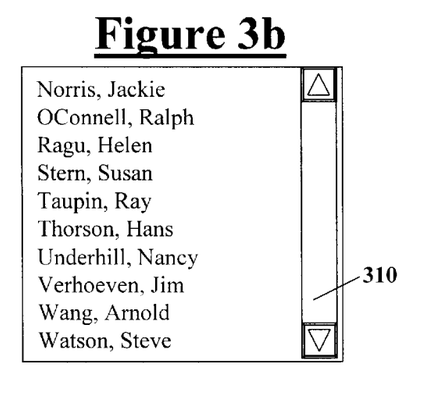
FIG. 3b illustrates a screen display from an addressbook after creating a subset containing only items that meet a user's first requirement.
Figure 3C:
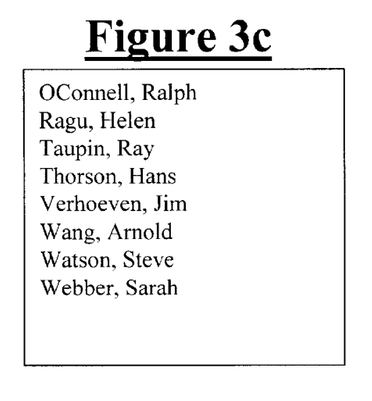
FIG. 3c illustrates a single page display after creating a subset containing only items that meet a two user requirements.
Figure 3D:
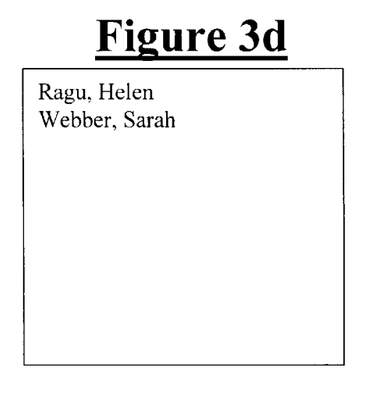
FIG. 3d illustrates a single page display after creating a subset containing only items that meet a three user requirements.

FIG. 3*a* illustrates the starting point of the navigation on a system that can only display ten names at once. Note that the first ten names of the full name list are displayed. To begin the navigation, the user enters an input that specifies if the first letter of the desired name is in a first subset or a second subset. Using the A to M and N to Z subsets, the user would specify the second subset since "W" is in the aliased subset N to Z. The system responds by displaying a list of the first ten possible names that meet the user's requirements as shown in FIG. 3*b*.

Note that at any time, the user may navigate to the desired name if some type of cursor positioning system is available. For example, a pair of scrolling keys may allow the user to scroll up or down the displayed list. Alternatively, the user may navigate by directly touch a digitizer pad on the display to activate the scroll bar 310.

If the user continues to specify the desired name using the aliased selection system, then the user enters the subset for the next letter. Specifically, the user will designate the first subset since "E" is in the aliased subset A to M. The system then generates a new subset of list items that meet the user's specifications. The new subset consists of only eight list items such that it now completely fits on the display screen as show in FIG. 3*c*. In one embodiment, the system informs the user that the entire list of possible items is displayed on the screen display of the handheld computer system by emitting an audible cue such as a simple beep. At this point, the user may desire to look at the list and select the desired item by directly touching it with a finger or a stylus.

Figure 3E:
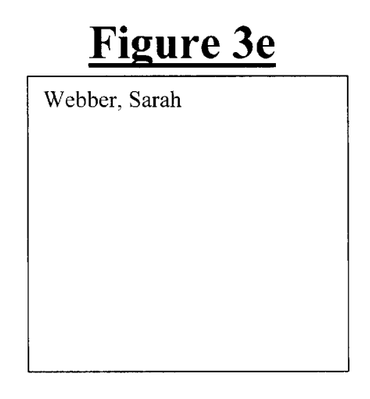
FIG. 3e illustrates a display of a single unique item after the user specified only four requirements.
Figure 3F:
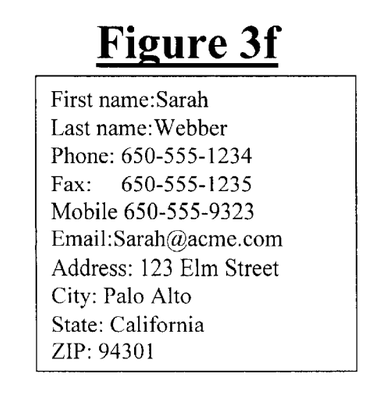
FIG. 3f illustrates a detailed display of a single unique item after the user specified only four requirements.

A user that does not wish to look at the display screen may continue to specify subset designations for additional letters. After a user has specified the first subset for the letter "B" only two items remain as displayed in FIG. 3*d*. After the user specifies the first subset for the next letter "B", only a single list item fits the user's qualifications as shown in FIG. 3*e*. At this point, the system again emits another audible cue to inform the user that a single unique list item has been identified. The audible cue may be the same as the audible cue used to specify that all the list items fit on a single page or it may be different.

In an alternate embodiment, once the user has entered enough information to uniquely specify a single list item, the system may go directly to a specific screen that displays detailed information about the selected item. For example, the system may proceed from screen FIG. 3d to FIG. 3f after the user specifies the first subset for the second letter "B" in the name "WEBBER". The system may simultaneously emit an audible cue to inform the user that a single unique list item has been identified.

Variations Of The Aliased Selection System

Figure 4A:
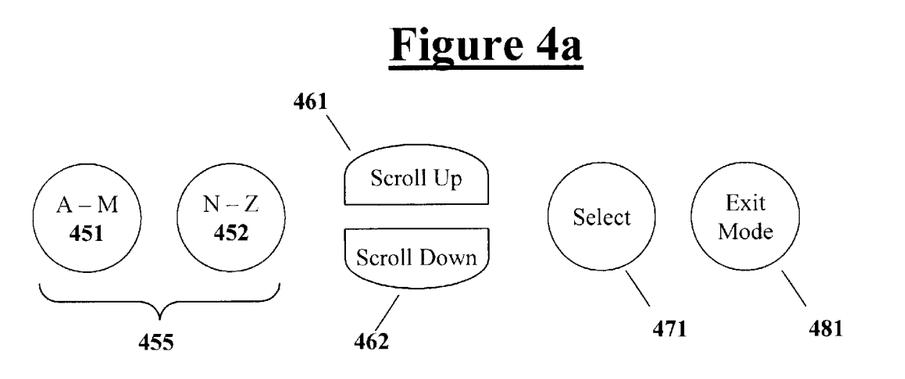
FIG. 4a illustrates handheld computer system keypad layout for a first implementation of an aliased selection system.
Figure 4B:
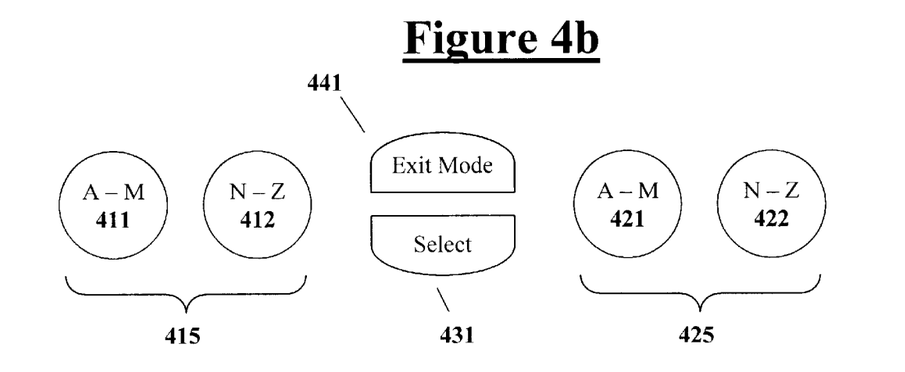
FIG. 4b illustrates handheld computer system keypad layout for a second implementation of an aliased selection system.

Many variations of the aliased selection system can be created using the teachings of the present invention. FIG. 4a and 4b will be used to describe two possible simple implementations using the interface available on Palm Computing and Handspring handheld computer systems. FIGS. 5 and 6a to 6d describe a sophisticated modal implementation that provides on-screen help to the user.

Scrollable List Embodiment

FIG. 4a illustrates a first implementation example. In the implementation of FIG. 4a, buttons 451 and 452 are used to designate between the A to M and N to Z subsets. This operation can easily be performed by a person with only one hand and without looking at the handheld computer system. Scrolling keys 461 and 462 can be used to highlight a specific item in a currently displayed list if the user wishes to manually navigate the list. Button 471 is used to select a highlighted item. Button 481 is used to exit the aliased selection system mode. Note that the user can also directly interact with list items on the screen and graphical user interface devices such as the scroll bar 310 in FIGS. 3a and 3b.

First and Last Name Embodiment

Referring to FIG. 4b, a second implementation allows a user to specify the next letter of either the first name or the last name a desired item in a list. For example, buttons 411 and 412 can be used to specify aliased information about the first name of a desired person in an addressbook and buttons 421 and 422 can be used to specify aliased information about the last name of the desired person. Such an embodiment may be desirable since a person may not remember the correct spelling of a particular first or last name. Button 431 can be used to open a highlighted item. Button 441 can be used to exit the aliased selection system mode.

A Modal Embodiment

Figure 5:
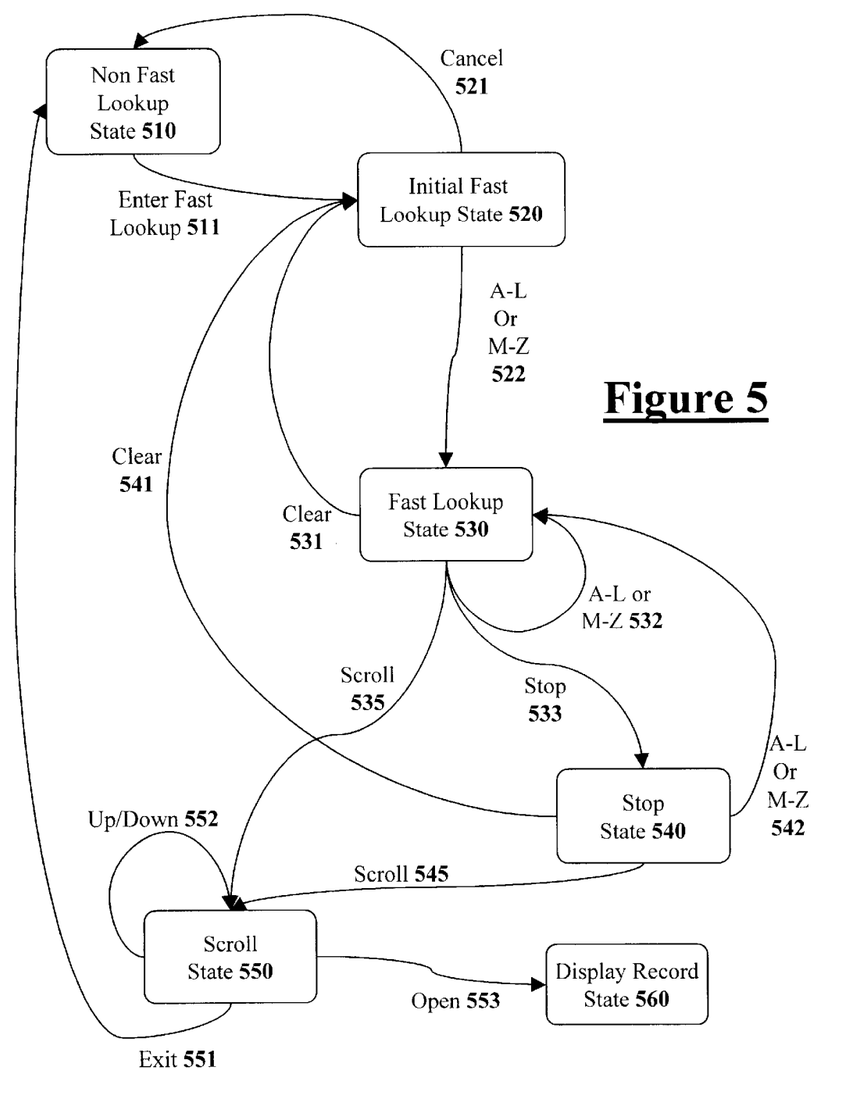
FIG. 5 illustrates a state diagram for a modal implementation of an aliased selection system.

FIGS. 5 and 6a to 6d describe a sophisticated modal implementation that combines some of the aspects of the scrollable embodiment and the first/last name embodiment. FIG. 5 illustrates a state diagram that describes the various states (or modes) of the modal embodiment. FIGS. 6a to 6d illustrate screen displays associated with the various states of FIG. 5.

Referring to FIG. 5, the system starts in some state 510 other than the aliased selection (or "fast lookup') state. The user then indicates that he wants to enter the fast lookup state along state transition 511. In one embodiment, the user may indicate this by pressing the up arrow button (461 in FIG. 4a) when the user is at the top of the scrolling list of names. This puts the handheld computer system into the initial fast lookup state 520.

Figure 6A:
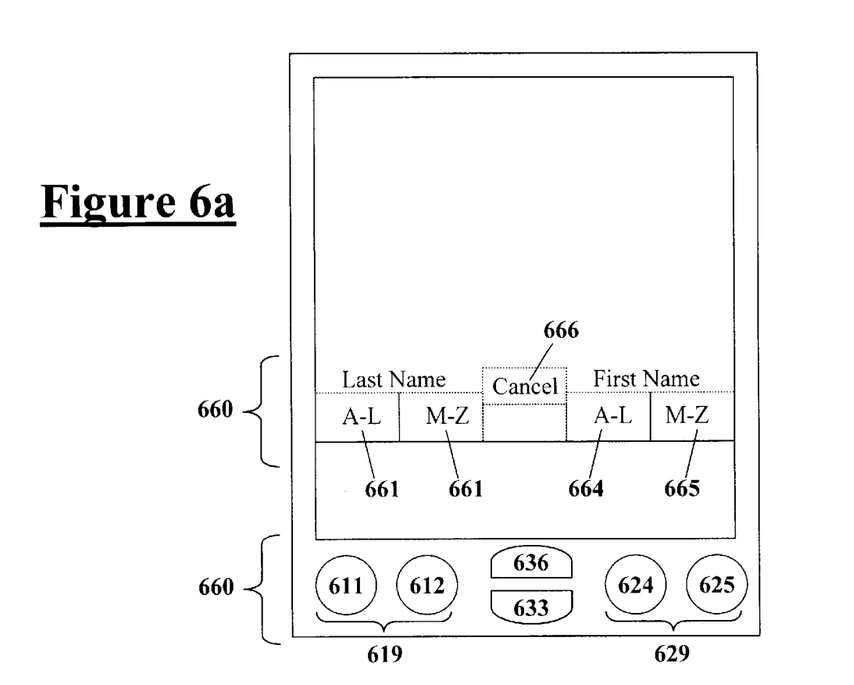
FIG. 6a illustrates a handheld computer system screen display for an initial fast lookup state of a modal implementation of an aliased selection system.

FIG. 6a illustrates one embodiment of how a handheld computer system may appear in the initial fast lookup state 520. Referring to FIG. 6a, a lower portion of the display area 660 is used to display the actions assigned to the mechanical buttons 660 at bottom of the handheld computer system. Specifically, the last name letter group A to L 661 is assigned to button 611, last name letter group M to Z 662 is assigned to button 612, first name letter group A to L 664 is assigned to button 624, first name letter group M to Z 665 is assigned to button 625, and "cancel" is assigned to up button 636. From the initial fast lookup state 520, the user may press cancel 666 to move back along cancel path 521 to the non fast lookup state 510 or press one of the letter groups to enter the fast lookup state 530 along path 522.

Figure 6B:
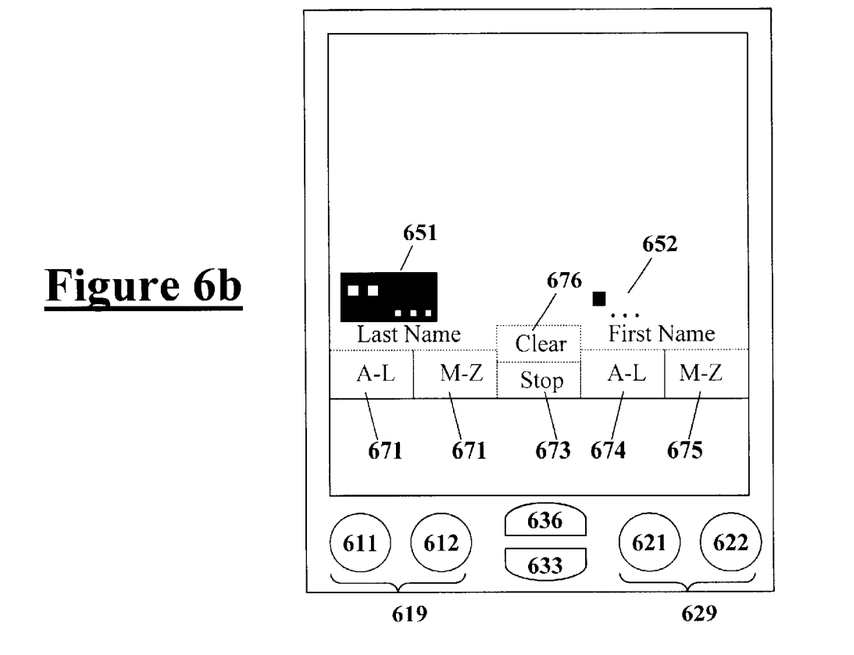
FIG. 6b illustrates a handheld computer system screen display for a fast lookup state of a modal implementation of an aliased selection system.

FIG. 6b illustrates one embodiment of how a handheld computer system may appear in the initial fast lookup state 530. While in the fast lookup state 530, the user may enter an aliased spelling of the desired person's name using the last name letter group A to L 661 assigned to button 611, last name letter group M to Z 662 assigned to button 612, first name letter group A to L 664 assigned to button 624, and first name letter group M to Z 665 assigned to button 625 as set forth in the previous sections.

Note that in the in the fast lookup state 530, the system provides feedback as to the number of letters that have been entered. Specifically, the two light squares and ellipsis 651 in FIG. 6b indicate that two letters from the desired person's last name have been entered. Similarly, the single dark square and ellipsis 652 indicates that only one letter from the desired person's first name has been entered. Note that the two light squares and ellipsis 651 are highlighted to indicate that the user is currently entering the last name of the desired person. There are actually two different fast look up states—a first name fast lookup state and a last name fast lookup state—but only a single fast lookup state is shown FIG. 5 for clarity. To clear a current name search, the user may hit the up button 636 to activate a clear 676 function that moves the system back to the initial fast lookup state 520 along clear path 531 in FIG. 5.

Referring back to FIG. 6b, if the user has entered all the letters of a first or last name then the user may "stop" the search by pressing the down button 633 to activate a "stop" 673 feature (also known as "no more letters"). The stop feature is used to indicate that there are no more letters for either the first or last name. Referring to FIG. 5, the stop feature moves the system along path 533 to a stop state 540. When the system enters the stop state 540, the spelling of the first or last name is stopped depending on if a first name letter subset input or a last name letter subset input key was most recently pressed, respectively.

Figure 6C:
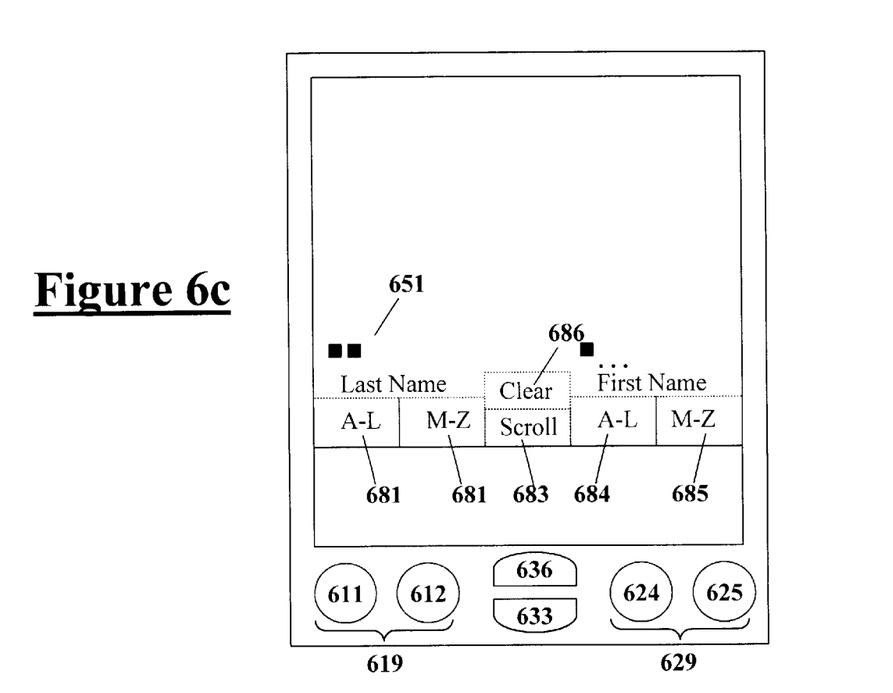
FIG. 6c illustrates a handheld computer system screen display for a stop state of a modal implementation of an aliased selection system.

FIG. 6c illustrates one embodiment of how a handheld computer system may appear in the stop state 540 when the stop state is entered after a last name letter subset key was most recently activated. When entering the stop state, the system will eliminate from consideration all names having a greater number of letters than the number of letters entered for the first or last name (depending on which name most recently had a letter defined). Thus, a short last name such as "Ho" may be entered with two letter group key presses and then one stop key press. Longer names with similarly aliased initial letters such as "Horstmann" would be eliminated from the list after pressing the stop key. FIG. 6c indicates that the stop state has been entered for the last name since the ellipsis has been removed after the two blocks 651 that indicate two last name letters have been defined.

Referring again to FIG. 5, if the name is actually longer and the stop feature was selected by accident, the user may return to the fast lookup state 530 along path 542 to the fast lookup state 530 by entering another letter. To clear the current search, the user may hit the up button 636 to activate a clear 686 function that moves the system back to the initial fast lookup state 520 along clear path 541 in FIG. 5. If the user wishes to scroll through the current items in the list, the user may select the scroll feature 683 with down button 633 from the stop state. Referring to FIG. 5, selecting the scroll feature will move the system from the stop state 540 along path 545 to the scroll state 550.

In one embodiment, a user may also enter the scroll state 550 directly from the fast lookup state 530. One method of allowing such a transition is by "overloading" a button with more than one feature. Specifically, in one embodiment, a user may transition from the fast lookup state 530 along path 535 directly to the scroll state 550 by holding down the down arrow button 633 for more than two seconds. Thus, the down marrow button 633 is used to enter both the stop state (by pressing the down arrow button 633 quickly) and the scroll state (by pressing the down arrow button 633 and holding it for more than two seconds).

Figure 6D:
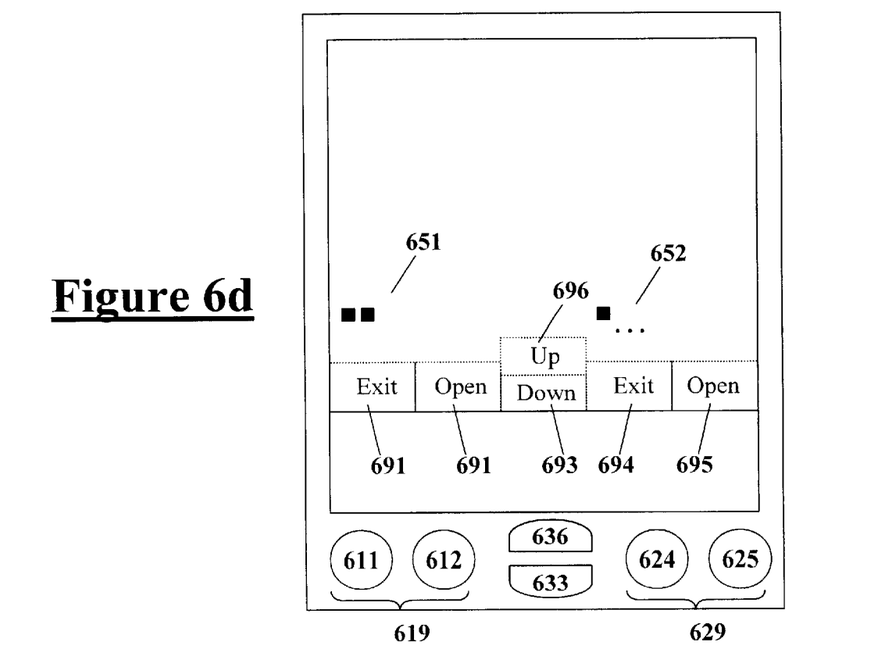
FIG. 6d illustrates a handheld computer system screen display for a scroll state of a modal implementation of an aliased selection system.

FIG. 6*d* illustrates one embodiment of how a handheld computer system may appear in a scroll state 550. In the scroll state 550, the user may scroll up or scroll down using buttons 636 and 633, respectively in order to select a particular entry in a displayed list of names. The user is informed of this ability with up notice 696 and down notice 693. After the user has selected a particular entry from the displayed list, the user may open the selected entry by pressing button 612 or 625 as noted by the "open" feature notice 691 and 695. Referring to FIG. 5, opening a list item moves the system from the scroll state 550 along path 553 to the display record state 560 where the opened record is displayed. Alternatively, the user can exit the fast lookup by selecting button 611 or 624 associated with "exit" notice 691 and 694. Referring to FIG. 5, exiting moves the system from the scroll state 550 along exit path 551 back to a non fast lookup state 510.

The modal embodiment described in FIGS. 6*a* to 6*d* looks up people in an addressbook database using the first and last names of the people. In another embodiment, the system can be used to look up a person using the person's last name and the name of the company or organization that the person is associated with.

The foregoing has described an aliased selection system with audible cues. It is contemplated that changes and modifications may be made by one of ordinary skill in the art, to the materials and arrangements of elements of the present invention without departing from the scope of the invention.

We claim:

1. A method of selecting a desired name from a list of names in a computer system, said computer system having a display, said method comprising:

dividing a character set into two subsets comprising a first subset of characters and a second subset of characters;

accepting a user input for specifying a designated subset from said two subsets of characters, said user input comprising
- a first user input designating said first subset of characters if a first letter position of said desired name is in said a first subset of characters or,
- a second user input designating said second subset of characters if said first letter position of said desired name is in said second subset of characters;

creating a sublist of names that have a character from said designated subset of characters in said first letter position;

displaying at least a portion of said sublist of names on said display; and repeating said steps of accepting user input, creating said sublist, and displaying for a next letter position in said desired name.

2. The method as claimed in claim 1, said method further comprising:

audibly indicating when said sublist of names fits on said display.

3. The method as claimed in claim 1, said method further comprising:

audibly indicating when said sublist comprises only said desired name.

4. The method as claimed in claim 1 wherein accepting said user input and creating said sublist of names comprises creating a successively smaller sublist by starting from said list of names and successively removing items.

5. The method as claimed in claim 1 wherein said desired name comprises a first name and a last name.

6. The method as claimed in claim 5 wherein accepting user input comprises accepting input specifying said first name or said last name.

7. The method as claimed in claim 1 further comprising:

accepting a stop search input; and removing names from said sublist of names having a greater number of letters than a number of letters defined with said user input.

8. The method as claimed in claim 1 further comprising:

accepting name selection input wherein a user may select any name in said sublist.

9. An item lookup system, said item lookup system comprising:

a display screen;

a list of items stored in a memory;

a character set, said character set divided into a first character subset and a second character subset;

a first input device, said first input device allowing a user to specify if a next letter in a desired item is in said first character subset;

a second input device, said second input device allowing said user to specify if said next letter in said desired item is in said second character subset; and first program code for accepting input to create a sublist of items displayed on said display from said list of items that eliminates items that do not satisfy requirements made by said user with said first input device and said second input device.

10. The item lookup system as claimed in claim 9 further comprising:

second program code for displaying said sublist of items.

11. The item lookup system as claimed in claim 9 further comprising:

second program code for emitting an audible cue when said sublist of items can be fully displayed on said display screen.

12. The item lookup system as claimed in claim 9 further comprising:

second program code for emitting an audible cue when said sublist of items comprises only one item.

13. The item lookup system as claimed in claim 12 wherein when said sublist is reduced to a single item, a second program code displays said single item in a detailed format.

14. An item lookup system, said, item lookup system comprising:

a display screen;

a list of items stored in a memory;

a first input device, said first input device allowing a user to specify if a next letter of a first name of a desired item is in a first subset of a character set;

a second unput device, said second input device allowing said user to specify if a next letter of a first name of said desired item is in a second subset of said character set;

a third input device, said first input device allowing said user to specify if a next letter of a second name of a desired item is in said first subset of said character set;

a fourth input device, said fourth input device allowing said user to specify if a next letter of a second name of said desired item is in said second subset of said character; and first program code for accepting input to create a sublist of items displayed on said display from said list of items that eliminates items that do not satisfy requirements made by said user with said first, second, third, and fourth input devices.

15. The item lookup system as claimed in claim 14 further comprising:

second program code for displaying said sublist of items.

16. The item lookup system as claimed in claim 14 further comprising:

second program code for emitting an audible cue when said sublist of items can be fully displayed on said display screen.

17. The item lookup system as claimed in claim 14 further comprising:

second program code for emitting an audible cue when said sublist of items comprises only one item.

18. The item lookup system as claimed in claim 14 further comprising:

second program code for displaying item in a detailed format when said sublist contains only one item.

19. The item lookup system as claimed in claim 14 wherein said first name is a person's first name and said second name is a person's last name.

20. The item lookup system as claimed in claim 14 wherein said first name is a person's last name and said second name is a company name.

* * * * *